US006714718B1

(12) United States Patent
Takayama et al.

(10) Patent No.: US 6,714,718 B1
(45) Date of Patent: Mar. 30, 2004

(54) RECORDING AND REPRODUCING APPARATUS COMPRISING RECORDING MEANS FOR RECORDING INPUT IMAGE SIGNAL OR WHICH AUTOMATICALLY REVIEWS AND PRODUCES RECORD IMAGES, A REPRODUCING SYSTEM FOR USE WITH A RECORDING DEVICE RECORDING AN IMAGE INPUT SIGNAL, AN APPARATUS FOR USE WITH A RECORDING AND REPRODUCING SYSTEM WHICH CONTINUOUSLY RECORDS A PLURALITY OF IMAGES, AND A REPRODUCING METHOD

(75) Inventors: Makoto Takayama, Yokohama (JP); Shigeo Yamagata, Yokohama (JP); Yuji Sakaegi, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 08/479,355

(22) Filed: Jun. 7, 1995

Related U.S. Application Data

(63) Continuation of application No. 08/086,575, filed on Jul. 6, 1993, now abandoned, which is a continuation of application No. 07/531,644, filed on Jun. 1, 1990, now abandoned.

(30) Foreign Application Priority Data

Jun. 2, 1989  (JP) ............................................. 1-140743
Jul. 20, 1989 (JP) ............................................. 1-185984
Nov. 6, 1989  (JP) ............................................. 1-288562

(51) Int. Cl.⁷ ................................................ H04N 5/76
(52) U.S. Cl. ......................... 386/46; 386/107; 358/906; 358/909.1
(58) Field of Search .............................. 360/35.1, 33.1, 360/10.1; 358/906, 335, 342, 909; 386/46, 101, 105, 106, 126, 107, 117, 125, 65, 121; 348/121, 220

(56) References Cited

U.S. PATENT DOCUMENTS

| 4,358,799 | A |   | 11/1982 | deNiet          |
|-----------|---|---|---------|-----------------|
| 4,532,558 | A | * | 7/1985  | Oota et al. ................... 360/35.1 |
| 4,611,314 | A | * | 9/1986  | Ogata et al. .................... 369/32 |
| 4,777,537 | A | * | 10/1988 | Ueno et al. .................. 386/101 |
| 4,783,707 | A | * | 11/1988 | Nemoto et al. .............. 358/342 |
| 4,805,042 | A | * | 2/1989  | Nishikata ....................... 386/65 |
| 4,812,922 | A | * | 3/1989  | Minoura et al. ............... 386/82 |
| 4,825,324 | A | * | 4/1989  | Miyake et al. ............... 358/906 |
| 4,845,571 | A | * | 7/1989  | Hirano et al. ............... 360/35.1 |
| 4,943,867 | A | * | 7/1990  | Suetaka et al. ............ 360/35.1 |
| 5,164,841 | A | * | 11/1992 | Takahashi .................... 386/106 |

FOREIGN PATENT DOCUMENTS

| EP | 0282084    |   | 9/1988  |                  |
|----|------------|---|---------|------------------|
| GB | 2029665    | * | 3/1980  | ................. 360/35.1 |
| JP | 58-187084  | * | 11/1983 | ................. 360/35.1 |

* cited by examiner

Primary Examiner—Huy Nguyen
(74) Attorney, Agent, or Firm—Fitzpatrick, Cella, Harper & Scinto

(57) ABSTRACT

A recording and reproducing apparatus for reproducing an immediately preceding recorded image includes recording circuitry for recording an input image signal on a recording medium. Reproducing circuitry is provided for reproducing an image signal recorded on the median. Control circuitry is provided for causing, immediately after the recording of an image signal for a plurality of consecutive frames on the recording medium, the reproducing circuitry to reproduce a specific still image signal from among the plurality of frames without a manual instruction being provided to the reproducing circuitry.

10 Claims, 11 Drawing Sheets

FIG. 4

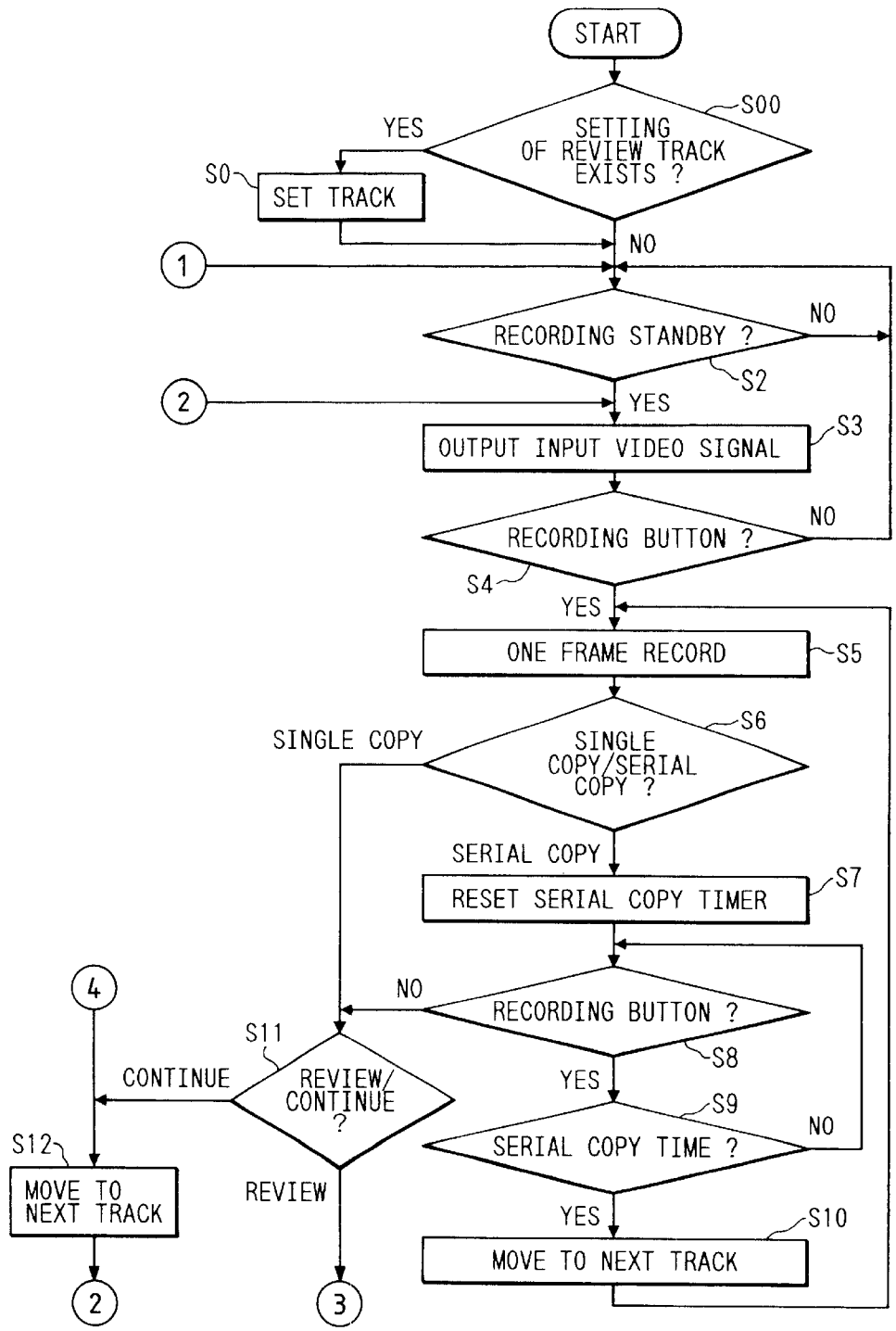

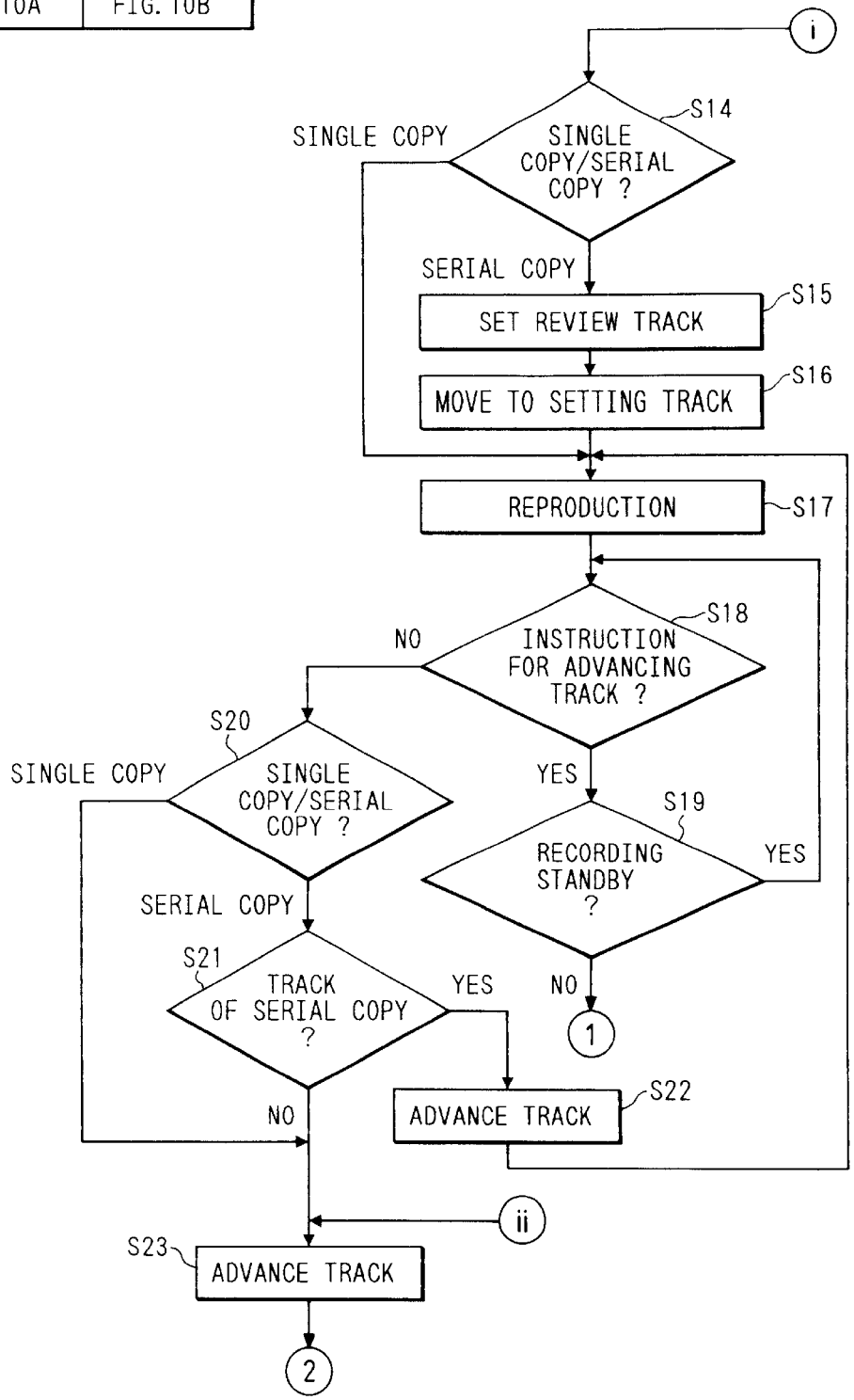

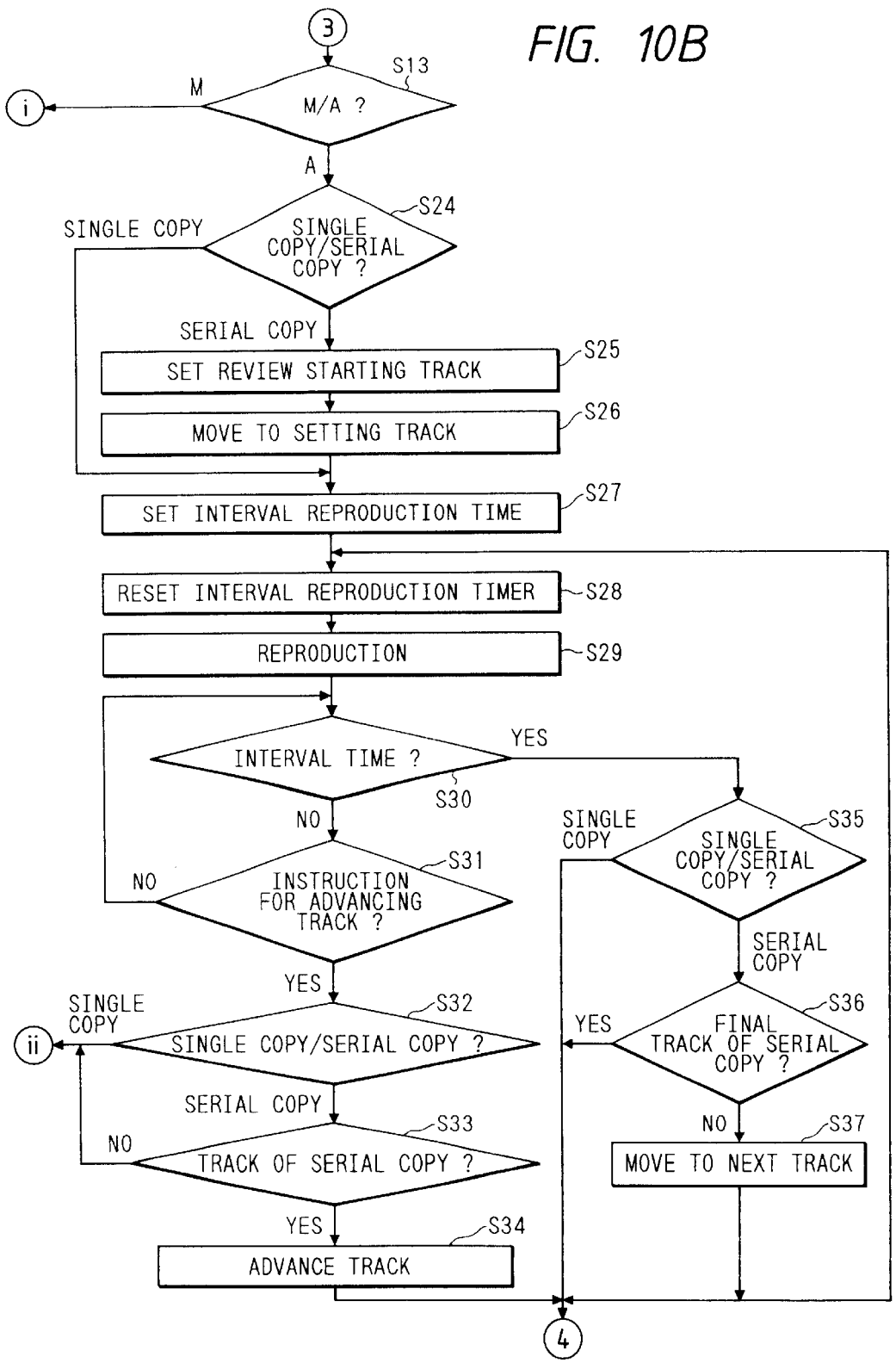

RECORDING AND REPRODUCING APPARATUS COMPRISING RECORDING MEANS FOR RECORDING INPUT IMAGE SIGNAL OR WHICH AUTOMATICALLY REVIEWS AND PRODUCES RECORD IMAGES, A REPRODUCING SYSTEM FOR USE WITH A RECORDING DEVICE RECORDING AN IMAGE INPUT SIGNAL, AN APPARATUS FOR USE WITH A RECORDING AND REPRODUCING SYSTEM WHICH CONTINUOUSLY RECORDS A PLURALITY OF IMAGES, AND A REPRODUCING METHOD

This application is a continuation of application Ser. No. 08/086,575 filed Jul. 6, 1993, now abandoned, which is a continuation of application Ser. No. 07/531,644 filed Jun. 1, 1990, now abandoned.

BACKGROUND OF THE INVENTION

1. Field of the Invention

This invention relates to a still image recording and reproducing system.

2. Related Background Art

In the Electronic Still Video Meeting held recently, a format for recording still images on a small size magnetic disk, i.e., a still video floppy, was prescribed. In the prescribed format, one field of an image signal is recorded on a single circular track, while one frame of a video signal is recorded using two tracks.

An electronic still camera is proposed and commercialized, which uses such a still video floppy as an image recording medium for recording still images picked up by a solid-state image pickup element. Such an electronic still camera, like a conventional still camera using silver chloride film as the recording medium, has a serial copy mode.

In such an electronic still camera with such a serial copy function, in a serial copy mode a video signal of the picked-up image is recorded on the still video floppy, while for monitoring a picked-up image, a signal prior to recording on the still video floppy is output to an electronic view finder or like image monitor.

With such an arrangement, however, the image that is observed with the image monitor in the serial copy mode is not always the same as the image recorded on the still video floppy. This means that confirmation of the recorded image requires an operation of setting up a reproduction mode, moving a magnetic head to a track on which the intended image is recorded, and reproducing the recorded image. This is very inconvenient.

It may be thought to arrange the systems such that immediately after recording on the still video floppy in serial copy mode, the recorded signal is reproduced and output to the image monitor to permit observation and confirmation of the recorded image itself. In such case, however, the serial copy speed is limited by the time required for the reproduction.

SUMMARY OF THE INVENTION

An object of the invention is to provide a recording and reproducing system which can solve the above problems.

Another object of the invention is to provide a system which permits satisfactory reproduction of a recorded image even in the serial copy mode.

To attain the above objects of the invention, there is provided a still image recording and reproducing system for recording still images on a recording medium and reproducing these recorded images therefrom, which is provided with control means for automatically reproducing the image last recorded in a serial copy mode, thus permitting simple confirmation of the recorded image in a case when continuously recording a plurality of still images as in the serial copy mode.

A further object of the invention is to provide a recording and reproducing system which provides satisfactory operation control properties even when it is desired to reproduce an image for confirmation immediately after the image is picked up.

The above and other objects and features of the invention will become more apparent from the following description of the embodiments with reference to the drawings.

BRIEF DESCRIPTION OF THE DRAWINGS

FIG. 4 is block diagram representation of a second embodiment of the invention;

FIGS. 9 and 10 are flow charts illustrating the operation of the third embodiment.

DETAILED DESCRIPTION OF THE PREFERRED EMBODIMENT

Now, preferred embodiments of the invention will be described with reference to the drawings.

Figure 1:
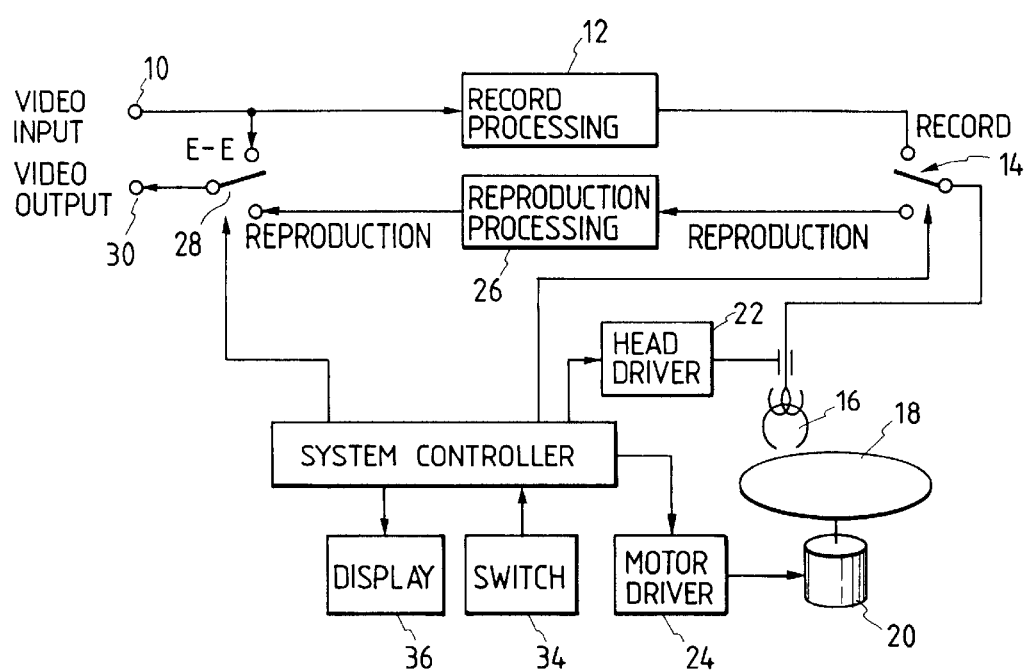
FIG. 1 is a block diagram representation of a first embodiment of the invention.

FIG. 1 is a block diagram representation of one embodiment of the invention. Reference numeral 10 designates a video input terminal, 12 a recording processing circuit, 14 a recording/reproduction switch, 16 a magnetic head, 18 a still video floppy (hereinafter referred to as floppy), 20 a spindle motor for rotating the floppy, 22 a head driver for driving magnetic head 16 in the radial direction of floppy 18, 24 a motor driver for driving motor 20, 26 a reproduction processing circuit, 28 a switch for selecting either reproduction video signal from reproduction processing circuit 26 or an input video signal supplied to video input terminal 10, 30 a video output terminal, 32 a system controller for controlling the entire system, 34 a switch unit consisting of a plurality of switches for providing predetermined instructions to system controller 32, and 36 a display for displaying the operating state, errors, etc.

Figure 2:
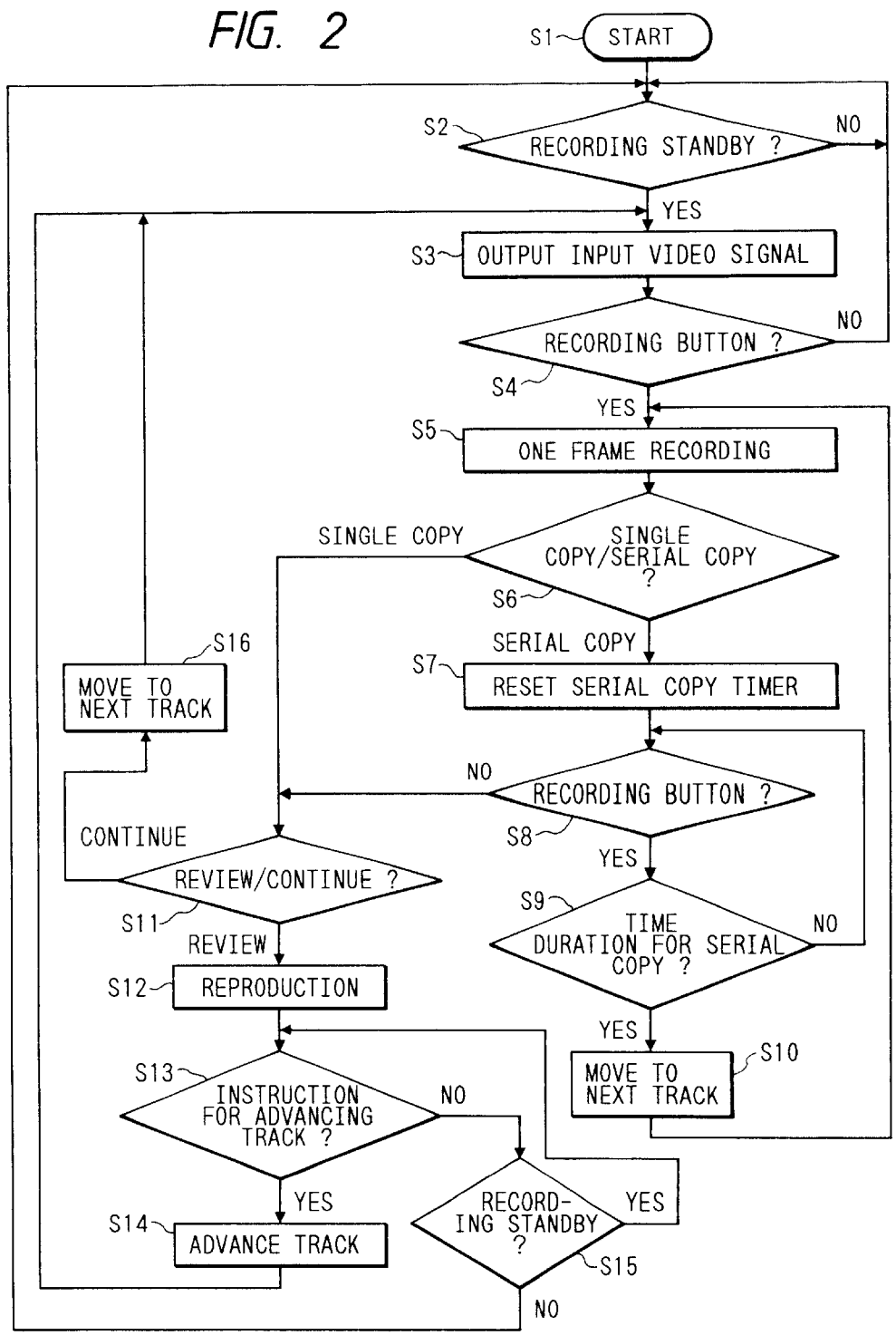
FIG. 2 is a flow chart illustrating the operation of the first embodiment.

FIG. 2 is a flow chart illustrating the operation of the embodiment. The operation of the system shown in FIG. 1 will now be described with reference to FIG. 2. After start (step S1), a recording standby state is set up (step S2). Then, when a recording standby switch in switch unit 34 is turned on, switch 28 is switched to the side of video input terminal 10 to output the input video signal from video output terminal 30 (step S3). Then, a state of waiting a recording instruction is set up by a recording button provided in switch unit 34 (step S4). When the recording button is depressed (step S4), one frame recording is effected (step S5), and a check is done as to whether single copy or serial copy is in effect (step S6). In the case of single copy, a check is done as to whether there is a review mode or a recording mode (step S11). In the case of the recording mode, magnetic head 16 is moved to the next track (step S16), thus setting up the recording standby state again (step S2). In the case of review mode (step S11), the recorded image is reproduced and output from video output terminal 30 (step S12). If there is a track advancement instruction (step S13), track advancement is effected (step S14), and the routine goes back to step S3. If there is no track advancement instruction (step S13), the routine goes back to step S13 so long as the recording standby state is in force. So long as the recording standby state is in force, the routine then goes back to step S2 (step S15).

If it is found in step S6 to be the case of serial copy, a serial copy timer is reset (step S7). Then, so long as the recording button is held depressed in copy time (step S8), the moving of the head to the next track (step S10) and one frame recording (step S5) are repeatedly performed whenever the copy time is passed. When the recording button is released, the routine goes to step S11, and the above routine (steps S11 through S16) is executed. In other words, in the case of review mode, the image of the immediately preceding recorded track is reproduced (step S12), thus permitting the recorded image to be confirmed.

Figure 3:
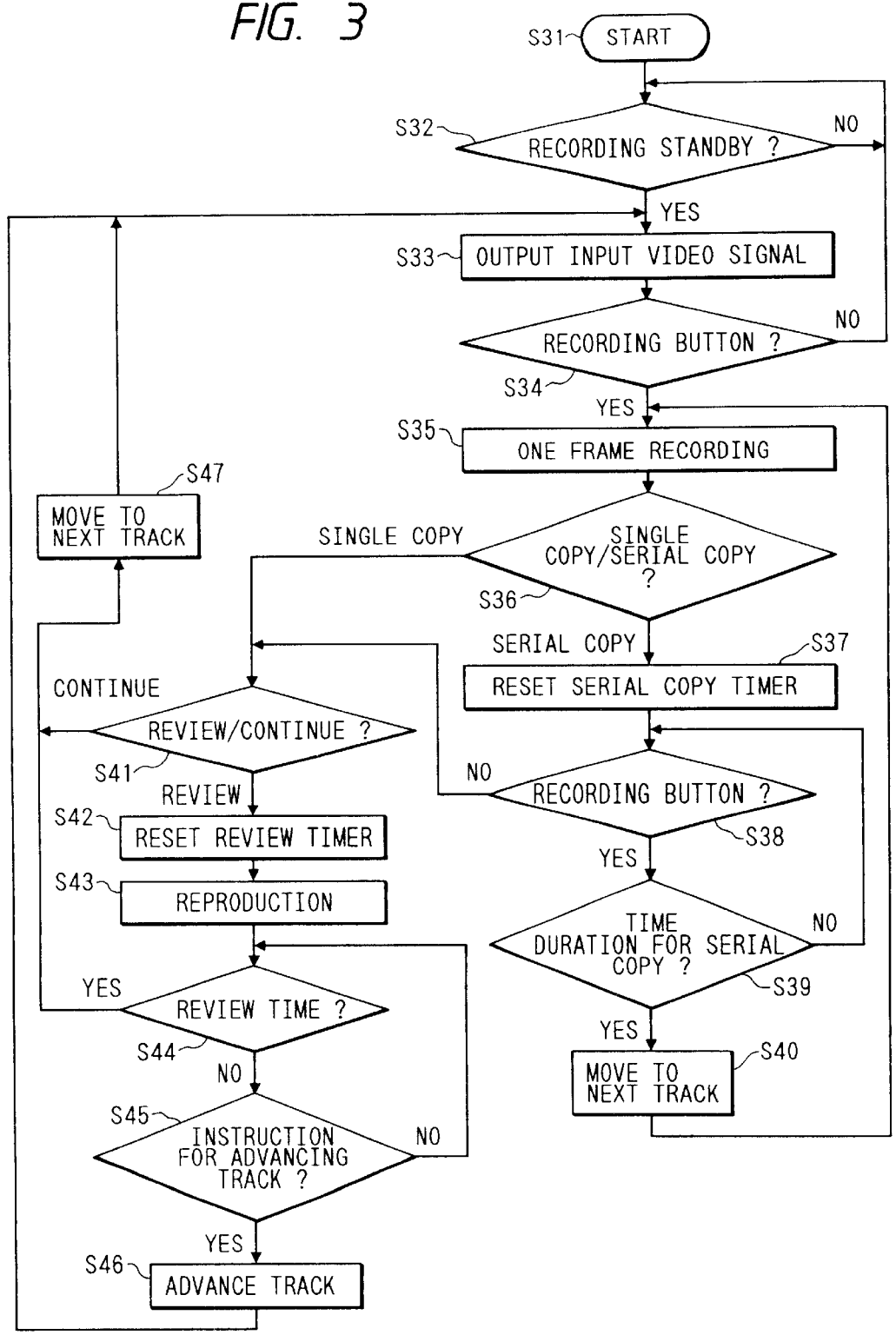
FIG. 3 is a flow chart illustrating a separate operation of the same embodiment.

FIG. 3 is a flow chart illustrating an altered operation. After start (step S31), the recording standby state is set up (step S32). Then, when the recording standby switch in switch unit 34 is turned on, switch 28 is switched to the side of video input terminal 10 to output the input video signal from video output terminal 30 (step S33), and then the state of waiting for a recording instruction is set up by the recording button (step S34). When the recording button is depressed (step S34), one frame recording is effected (step S35), and a check is done as to whether single copy or serial copy is in force (step S36). In the case of single copy, a check is done as to whether there is a recording mode or a review mode, (step S41). In the case of the recording mode, magnetic heads 16 is moved to the next track to set up the recording standby state again, and the routine goes to step S33 (step S34). In the case of review mode,(step S41), a review timer is reset (step S42), and the recorded image on the track at this instant is reproduced and output from video output terminal 30 (step S43). If there is a track advancement instruction in review time (step S44 and S45) track advancement is effected (step S46), and the routine goes back to step S33. When the review time is passed (step S44), the head is moved to the next track to set up the recording standby state again, and the routine goes to step S33 (step S47).

If it is found in step S36 to be in the case of serial copy, the serial copy timer is reset (step S37), and so long as the recording button is held depressed in the serial copy time (step S38) the movement of the head to the next track (step S40) and one frame recording (step S35) are repeatedly performed whenever the serial copy time is passed. When the recording button is released, the routine goes to step S41, and the above routine (steps S41 through S47) is executed. In other words, in the case of review mode the image of the immediately preceding recorded track is reproduced (step S43) to permit the recorded image to be confirmed.

It is to be understood from the above that in this embodiment the last recorded image in the serial copy is automatically reproduced to permit automatic confirmation of the recorded content. The recorded content thus can be confirmed quickly and easily.

The next embodiment of the invention concerns a recording and reproducing system in which the immediately preceding recorded image is reproduced automatically holding recording instruction means in a predetermined state, thus dispensing with a cumbersome operation of setting up a review mode for the confirmation of the recorded image.

Figure 4:
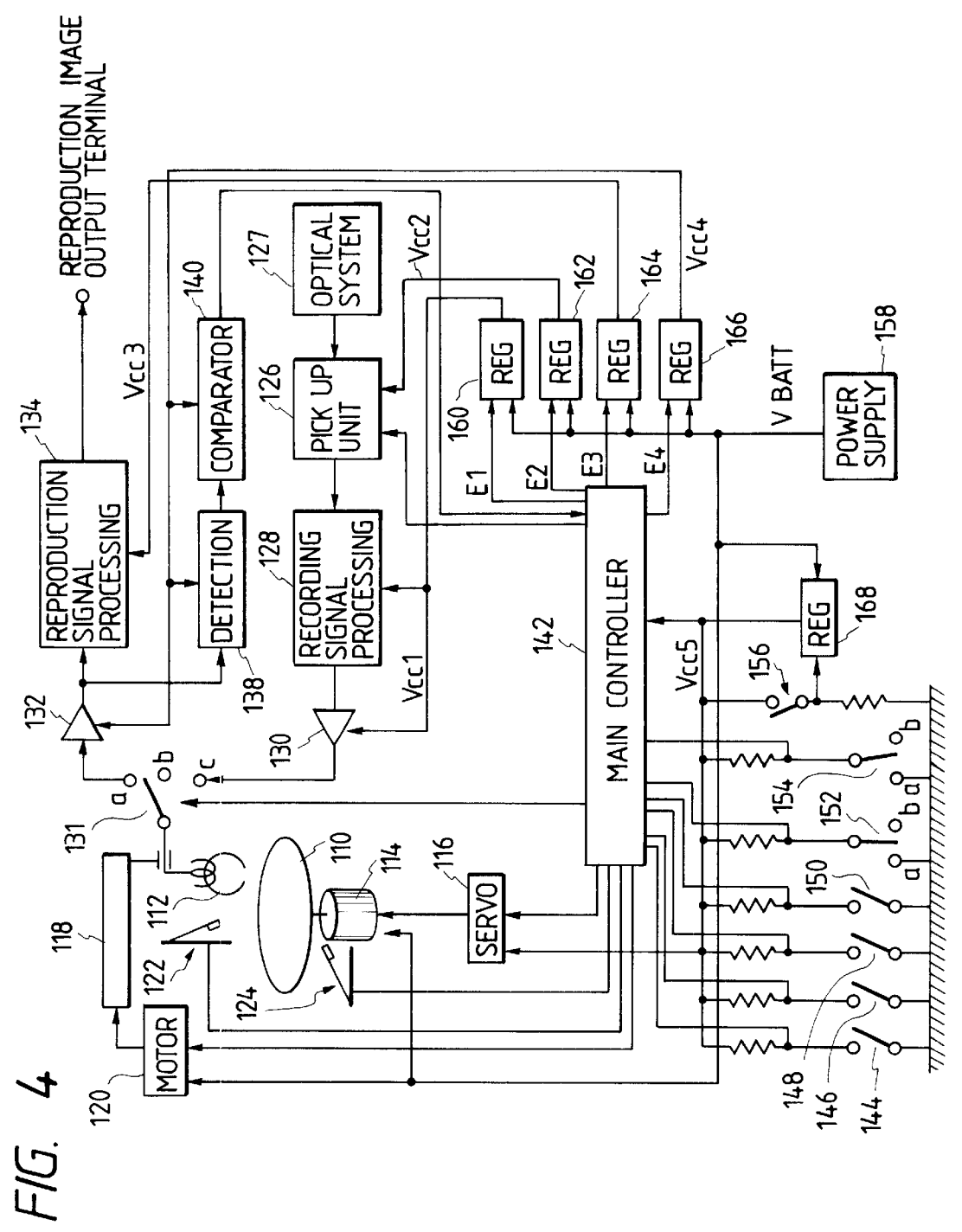

FIG. 4 is a block diagram representation of a second embodiment of the invention. Reference numeral 110 designates a magnetic disk with 50 tracks of No. 1 to No. 50 from the outermost track, 112 a recording/reproducing magnetic head, 114 a motor for driving magnetic disk 110, 116 a servo circuit for controlling the revolving rate of motor 114 to a predetermined value, 118 a head moving mechanism for moving magnetic head 112 in the radial direction of magnetic disk 110 to a position corresponding to a designated track, 120 a stepping motor for providing a drive force to head moving mechanism 118, 122 an innermost track detection switch which is turned on when magnetic head 112 is brought to the position corresponding to the innermost track, and 124 a disk detection switch for detecting the setting of magnetic disk 110.

Reference numeral 126 designates a pickup unit for converting optical image from optical system 127 into electric signal, 128 a recording signal processing circuit for converting the output signal of pickup circuit 126 into a signal suited for recording on magnetic disk 110 through such recording signal processing as gamma correction and frequency modulation, and 130 a recording amplifier. Reference numeral 131 designates a switch which is switched to the side of contact a for reproduction and to the side of contact c for recording. Reference numeral 132 designates a reproduction amplifier. Reference numeral 134 designates a reproduction amplifier, and 134 is a reproduction signal processing circuit for producing a reproduction video signal through reproduction signal processing such as frequency demodulation on the output of reproduction amplifier 132. Reference numeral 138 is a detection circuit for envelope detecting the output of reproduction amplifier 132, and 140 is a comparator for comparing the output voltage from detection circuit 138 to a predetermined reference voltage.

Reference numeral 142 designates a main controller for controlling the individual circuits noted above, 144 a switch for providing a track-up instruction, and 146 a switch for providing a track-down instruction. Reference numeral 148 designates a switch for instructing a preparation for recording operation, and 150 is a switch for instructing the execution of the recording operation. Switch 148 is turned on by depressing a push switch, and switch 150 is turned on by further depressing the push switch. Reference numeral 152 designates a recording/reproduction mode designation switch, which is switched to the side of contact a when setting up a recording mode and to the side of contact c when setting up a reproduction mode. Reference numeral 154 designates a switch for designating either single copy (S) or serial copy (C), and 156 is a power source switch for connecting the system to a power source.

Reference numeral 158 designates a DC power supply consisting of a battery or an AC adopter, and 160, 162, 164, 166 and 168 are regulators for forming power source voltages necessary for individual circuits from the output voltage of power supply 158. The outputs of these regulators are on-off controlled by control signals E1 to E4 from main controller 142 and switch 156. Regulator 160 supplies power to recording amplifier 130 and also to recording signal processing circuit 128, regulator 162 supplies power to pickup circuit 126, regulator 164 supplies power to reproduction signal processing circuit 134, and regulator 166 supplies power to detection circuit 138 and comparator circuit 140. Regulator 168 applies switch state detection voltages through a pull-up resistor to each of switches 144 to 154 and supplies operating power to servo circuit 116 and main controller 142.

The operation of the system shown in FIG. 4 will now be described. The output voltage of power supply 158 is applied directly to power source switch 156. When switch 156 is turned on, regulator 168 detects this and supplies power supply voltage Vcc5 to servo circuit 116 and also to main controller 142 and further through pull-up resistors to switches 144 to 154. Now, the operation will be described with reference to the flow charts shown in FIGS. 5 to 7. When power source switch 156 is turned on (step S1), power is supplied to main controller 142 in the manner as described above. At this instant, control signals E1 to E4 are all "low", and thus regulators 160 to 166 are all inoperative. When main controller 142 is informed by disk detection switch 124 of the loading of magnetic disk 10 (step S2), it operates servo circuit 116 to rotate disk 110 at a constant speed (step S3). Then, it checks from the output of innermost track detection switch 122 as to whether magnetic head 112 is at a position corresponding to track No. 50, i.e., the innermost track (step S4) and moves head 112 inwards until reaching thereby the position corresponding to the innermost track (step S5).

When magnetic head 112 is brought to the position corresponding to the innermost track, switch 131 is switched to the side of contact a to make control signal E4 "on" (step S6). When control signal E4 becomes "on", regulator 166 supplies power to reproducing amplifier 132, detection circuit 138 and comparator 140. Then, the reproduction output from the track is supplied through reproduction amplifier 132 to detection circuit 138, and comparator 140 compares the output of detection circuit 138 to a predetermined reference level. Whether recording is completed or not can be checked from the result of the comparison noted above. If recording has not been completed, magnetic head 112 is moved for track-down by one track after another (step S9) until a track, on which the recording has been completed, is found (step S7) or until the position corresponding to track No. 1 is reached (step S8).

If a track, on which recording has been completed, is found (step S7), main control circuit 142 executes a check from the output of recording/reproduction mode switch 152 as to whether there is a recording mode (step S10). Unless there is the recording mode, the routine goes to step S8. If there is the recording mode, a check as to whether the head is at the position corresponding to track No. 50 is done (step S11). If the head is at track No. 50, servo circuit 116 is turned off to stop magnetic disk 110, while control signal E4 is made "low" to render regulator 166 inoperative (step S13). Unless the head is at track No. 50 (step S11), the head is moved track-up by one track, and then servo circuit 116 is turned off to make control signal E4 "low" and render regulator 166 inoperative (step S12). The routine then goes to step S14.

If it is found in step S8 that the head is at track No. 1, after step S12 a check as to whether there is the recording mode is done (step S14). If the recording mode is not provided, control signal E3 is made "high" to render regulator 164 operative and wait for a key input (step S15). With regulator 164 rendered operative, video signal processing ciruit 134 is rendered operative to produce reproduction video signal. If the recording mode is provided, a key input is waited for (step S16).

As has been shown, if the recording mode is provided at the time of the loading of magnetic disk 110, the head is moved outwardly from the innermost track while checking whether recording on each track has been completed, thus bringing the head to a position corresponding to a non-recorded track next to the innermost recorded track, and a key input is waited for. If track 50 is a recorded track, the operation in the recording mode is ended. In the case of the reproduction mode, the head is moved outwardly from the innermost track. That is, magnetic head 112 is first brought to the position corresponding to track No. 1, a reproduced signal from track No. 1 is provided from the reproduction video output terminal, and a key input is waited for.

Now, the actual recording operation will be described. When the routine goes from step S16 to step S17 in FIG. 6, a check as to whether the recording mode is provided is done (step S17). If the recording mode is not provided, servo circuit 116 is rendered operative to make control signal E2 "low" and render regulator 162 inoperative (step S31). The routine then goes to step S6 in FIG. 5 to set up the reproduction mode. If the recording mode is provided, turning on recording preparation switch 148 (step S18) renders servo circuit 116 operative, thus driving magnetic disk 110, making control signal E2 "high" and rendering pickup circuit 126 operative. With recording switch 150 turned on, control signal E1 is made "high" to render recording signal processing circuit 128 and recording amplifier 130 operative (step S21), have switch 131 switched to the side of contact c for a period of 1 V and record image signals from pickup circuit 126 on the track, which magnetic head 112 is at a position corresponding to (step S22). Then, control signal E1 is made "low" to turn off the power supply to recording signal processing circuit 128 and recording amplifier 130 (step S23).

If recording switch 150 remains "on" (step S24), a check as to whether serial copy is in force is done according to the output of S/C switch 154 (step S25). If the serial copy is not in force, control signal E2 is made "low" to turn off the power supply to pickup circuit 126, switch 131 is switched to the side of contact a, and control signals E3 and E4 are made "high" to permit power supply to reproduction amplifier 122 and also to reproduction signal processing circuit 134 (step S26). As a result, a reproduced image signal of the immediately preceding recorded image is output from the reproduced image output terminal. The routine then goes back to step S24.

When recording-switch 150 is "off" (step S24) or when recording switch 150 is "on" while serial copy is in force (step S25), control signals E3 and E4 are made "low" to turn off the power supply to reproduction amplifier 132 and also to reproduction signal processing circuit 134 (step S27). If the current track is not track No. 50, the head is moved for track-up by one track (step S29), and the routine goes to step S17. If the current track is track No. 50, control signal E2 is made "low" to turn off power supply to pickup circuit 126 (step S30), and the routine goes to step S31 in FIG. 5, thus bringing an end to the routine.

Figure 6:
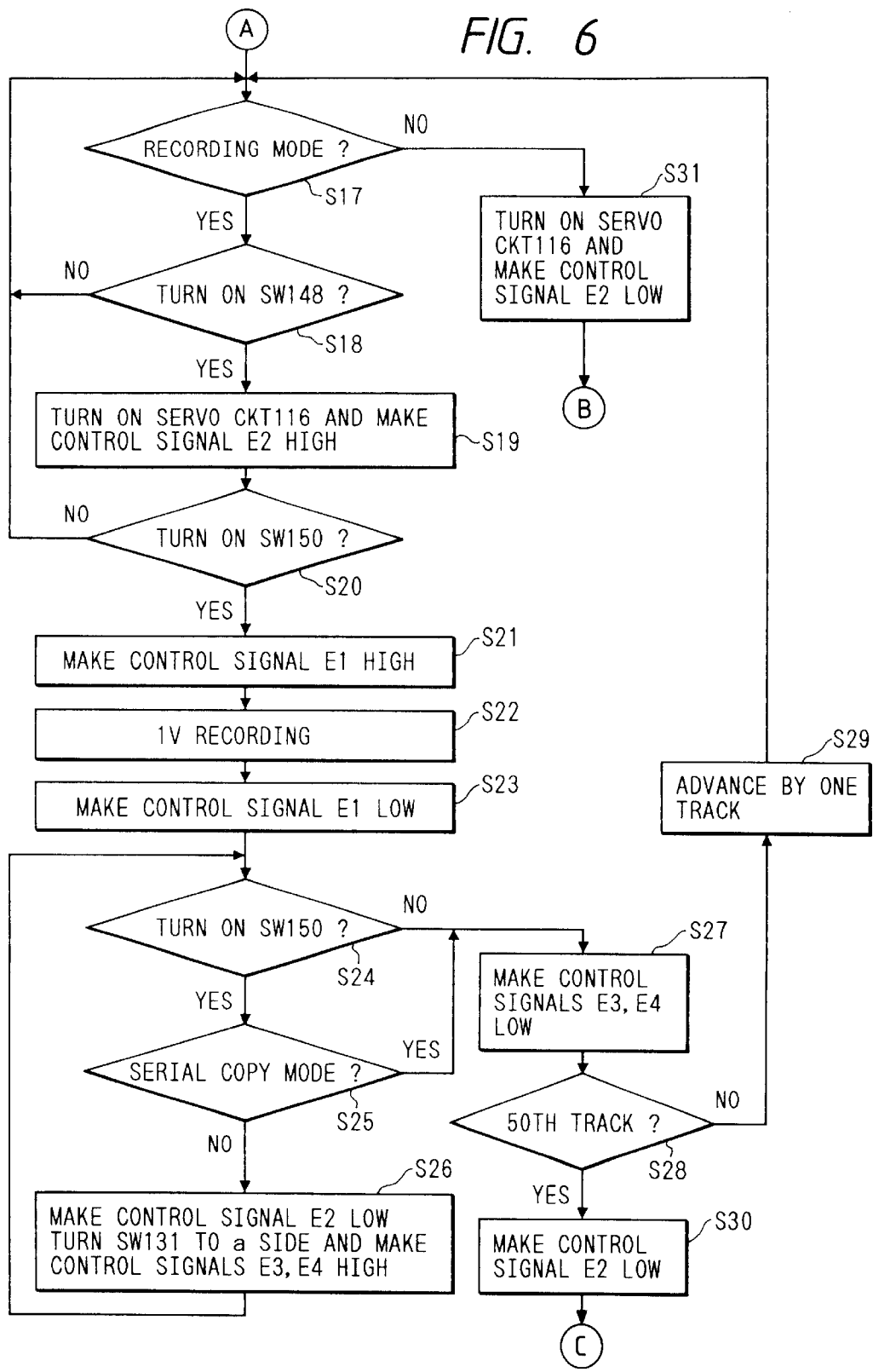
Figure 7:
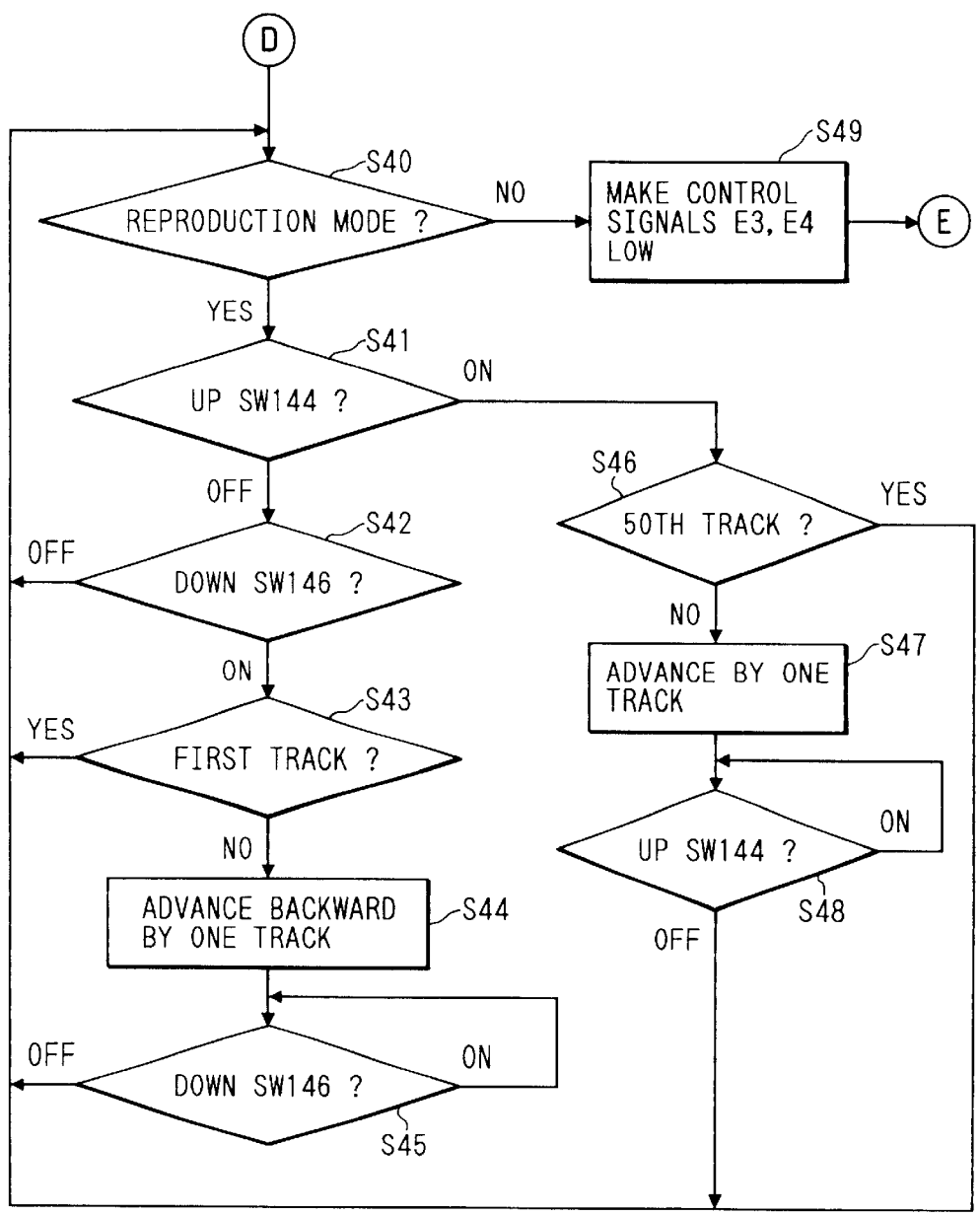

If will be seen from steps S24 to S29 in FIG. 6 that if recording switch 150 is continually held "on" after execution of recording, in other case than serial copy the reproduction mode is automatically set up, and the immediately preceding recorded image is reproduced and output. In the case of serial copy, recording is performed while magnetic head 112 is moved inwardly until track No. 50 is recorded.

Now, an operation subsequent to the setting of the key input waiting state in the reproduction mode (step S15) will be described. In this case, the routine goes from step S15 to step S40 in FIG. 7 to execute a check as to whether the reproduction mode is provided (step S40). If the reproduction mode is not provided, control signals E3 and E4 are made "low" to turn off power supply reproduction amplifier 132 and reproduction signal processing circuit 134, and the routine then goes to step S4 in FIG. 5. In the reproduction mode (step S40), up- and down-switches 144 and 146 are checked (steps S41 and S42). If up-switch 144 is "on" while the current track is not track No. 50 (step S46), magnetic head 112 is moved inwardly by one track (step S47). When up-switch 144 is turned off, the routine goes back to step S40. If down-switch 142 is "on" while the current track is not track No. 1 (step S43), magnetic head 112 is moved outwardly (step S44). When down-switch 146 is turned off (step S45), the routine goes back to step S40. If up- and down-switches 144 and 146 are not both "on", the routine goes back to step S40.

In this embodiment, the power supply is controlled more sophisticatedly in the recording and reproduction modes according to control signals E1 to E4 to permit reduction of power consumption and more efficient use of power.

As has been shown, in this embodiment by continually holding the recording switch "on" after recording an image in single copy mode the recorded image is automatically reproduced to permit quick confirmation of the recorded image.

Now, a further embodiment will be described, in which an image designated in advance can be reproduced after a serial copy operation, thus simplifying the operation of confirming the recorded image. The embodiment will now be described with reference to the drawings.

Figure 8:
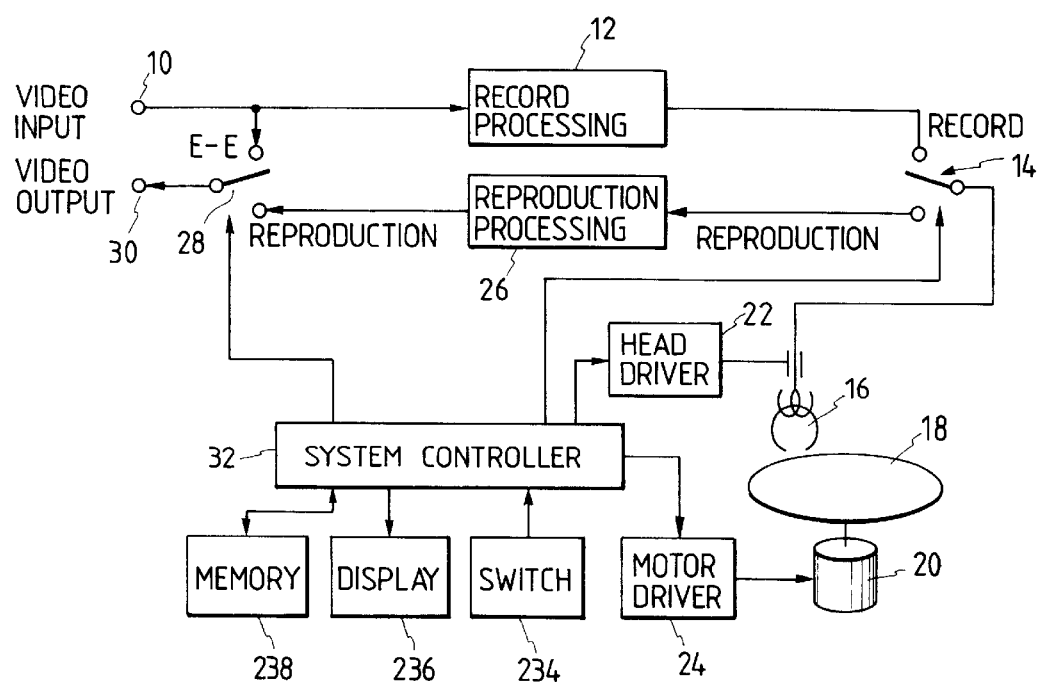
FIG. 8 is a block diagram representation of a third embodiment of the invention.

FIG. 8 is a block diagram representation of a third embodiment of the invention. Elements in FIG. 8 other than those in FIG. 1 will be described. Referring to FIG. 8, reference numeral 234 designates a switch unit including a plurality of switches for inputting predetermined instructions to main controller 232. The unit includes switches for setting recording standby, recording, reproduction and review modes and also auto-review and manual review modes and also setting the first track No. in the auto-review mode. Reference numeral 236 designates a display for displaying the operating state, errors, etc. Reference numeral 238 designates a memory, which memorizes the start position or number of frames in the serial copy in this system.

FIGS. 9 and 10 are flow charts illustrating the operation of the embodiment. The operation of the system shown in FIG. 8 will now be described with reference to FIGS. 9 and 10. First, a check as to whether a review track has been set in the auto-review mode for serial copy is done with a switch in switch unit 234 (step S00). If the review track setting exists, the set number is input to memory 238 (step S0). After start (step S1) a recording standby state is set up (step S2). When a recording standby switch in switch unit 234 is subsequently operated, switch 28 is switched to the side of video input terminal 10 to output an input video signal from video output terminal 30 (step S3). Then a state of waiting for an instruction for recording is brought about by a recording button (step S4). When the recording button is depressed (step S4), one frame recording is executed (step S5), and a check as to whether single or serial copy is in force is done (step S6). In case of single copy, a check as to whether there is a recording mode or a review mode is done (step S11). In the recording mode, magnetic head 16 is moved to the next track (step S12) to bring about the recording standby state (steps S2 through S4).

In the review mode (step S11), a check as to whether the mode is manual (M) or auto (A) is done (step S13). If the mode is manual, a check as to whether the serial or single copy is in force is done (step S14). If the serial copy is in force, the track to be reviewed, as set in steps S00 and S0, is read out from memory 238, and head 16 is moved to that track. If the single copy is in force, reproduction is performed at that track (step S17). As data which is set in memory 238, a relative number is input, such as the second track or last but one track in serial copy tracks. It is possible to input a frame number instead of a track number. During the reproduction, a track movement instruction or release of the recording standby button is waited for (steps S18 and S19). If the recording standby button is released in the absence of a track movement instruction, a state of waiting for the operation of the recording standby button is set up (step S2). When a track movement instruction is provided (step S18), in the case of single copy (step S20) the head is moved to the instructed track (step S23) to output the input video signal (step S3). If a track movement instruction for serial copy is provided (step S21) in the serial copy mode (S20), the head is moved to that track (step S22), and the image is reproduced (step S17). If no track movement instruction for serial copy is provided (step S21) in the serial copy mode (step S20), the head is moved to the instructed track (step S23), and an input video signal output state is set up (step S3).

If serial copy mode is provided (step S24) in the auto mode (step S13) in the review mode (step S11), the number data stored in memory 238 is read out (step S25), the head is moved to the set track according to the read-out number (step S26), and an interval reproduction time is set (step S27), an interval reproduction time is reset (step S28), and reproduction is performed (step S29). In the case of single copy (step S24), an interval reproduction time is set (step S27), the interval reproduction timer is reset (step S28), and reproduction is performed (step S29).

When a track movement instruction is provided while the interval time has not yet been passed (steps S30 and S31), in the case of single copy the head is moved to that track (step S23), and an input video signal output state is set up (step S3). In the case of serial copy (step S32), if the current track is a track of serial copy (step S33), the head is moved to that track (step S34), the interval reproduction timer is reset, reproduction of the image from that track is performed (steps S28 and S29). If the track is not a track of serial copy (step S33), the head is moved to that track (step S23), and the input video signal output state is set up (step S3).

When the interval time has been passed, in the case of single copy the head is moved to the next track (step S12), and the input video signal output state is set up (step S3). If the track is the last track in serial copy (step S36) in case of serial copy, the head is moved to the next track (step S12), and an input video signal output state is set up (step S3). If the current track is not the last track of serial copy (step S36), the head is moved to the next track (step S37), the interval reproduction timer is reset (step S28), and reproduction of the image from that track is performed (step S29).

In summary, if the single copy review mode is a manual mode, the recorded image is reproduced, and if a track movement instruction is provided, the input video signal is output to set up the recording standby state. If the serial copy review mode is a manual mode, the recorded image on a track (for instance the first track, the second track or the last track) is reproduced. If the track is in the serial copy, reproduction can be executed. If the track is not so, the input video signal is output, and the recording standby state is set up.

If the serial copy review mode is an auto-mode, reproduction of data from that track is executed for a constant period of time after the recording, and then the head is moved to the next track, the input video signal is output, and the recording standby state is provided. If the serial copy review mode is an auto-mode, after completion of serial copy the reproduction is started from a preset track (for instance the first, second or last track in the serial copy), interval reproduction is performed up to the last track, then the head is moved to the next track, the input video signal is output, and the recording standby state is set up.

In the above case, interval reproduction from a track which is set after recording to the last track in the serial copy is done if the serial copy review mode is an auto-mode, it is also possible to execute in this case an interval reproduction from the first track of the serial copy to a designated track.

As has been shown, in this embodiment a review mode for reproducing a recorded image after recording is provided to permit manual review or auto-review in either case of serial or single copy, thus facilitating the confirmation of recorded image.

In the embodiments of FIGS. 1 and 8, on image pickup system as shown at 126 to 128 in FIG. 4 is not particularly shown, but it is to be understood that such an image pickup system may be provided.

Further, while in the above embodiments use is made of a magnetic disk as the recording medium, this is by no means limitative, and it is possible to use magnetic tape, optical disk, opto-magnetic disk, semiconductor memory, etc. as well.

What is claimed is:

1. A recording and reproducing apparatus comprising:

recording means for recording an input image signal on a recording medium;

output means for outputting an image corresponding to the image signal recorded on the recording medium;

means for changing said apparatus among a first recording mode in which a single image is recorded and a second recording mode in which a plurality of images are recorded at a predetermined time interval;

record instruction means for providing an instruction for operation of said recording means, said record instruction means having a first state in which a user is operating said record instruction means, and a second state in which a user is not operating the record instruction means; and control means for controlling said recording means in response to changing of said record instruction means from the second state to the first state in the first recording mode, and for operating said output means and reproducing the immediately previously recorded image signal as long as said record instruction means is in the first state with the user continually operating said record instruction means, and stopping the reproduction in response to said record instruction means transitioning from the first state to the second state, and for making said output means inoperative upon a beginning of the second recording mode.

2. The recording and reproducing apparatus according to claim 1, wherein said recording medium comprises a disk-like shape.

3. The recording and reproducing apparatus according to claim 1, wherein said recording medium comprises a magnetic recording medium.

4. The recording and reproducing apparatus according to claim 1, wherein said recording means includes a recording head movable relative to said recording medium.

5. The recording and reproducing apparatus according to claim 1, wherein said record instruction means includes a push switch, said first state being obtained with said push switch held pushed.

6. A recording and reproducing method comprising the steps of:

recording an input image signal on a recording medium;

outputting an image corresponding to an image signal recorded on the recording medium;

changing among a first recording mode in which a single image is recorded and a second recording mode in which a plurality of images are recorded at a predetermined time interval;

providing an instruction for recording in either a first operation state in which a user operates record instruction means, or a second operation state in which a user is not operating the record instruction means; and controlling recording in response to changing of the record instruction from the second operating state to the first operating state in the first recording mode, and reproducing and outputting the immediately previously recorded image signal as long as the record instruction means is in the first state with the user continually operating the record instruction means, and stopping the reproduction in response to the record instruction means transitioning from the first state to the second state, and making the output inoperative upon a beginning of the second recording mode.

7. The recording and reproducing method according to claim 6, wherein the recording medium comprises a disk-like shape.

8. The recording and reproducing method according to claim 6, wherein the recording medium comprises a magnetic recording medium.

9. The recording and reproducing method according to claim 6, wherein said recording step includes moving a recording head relative to the recording medium.

10. The recording and reproducing method according to claim 6, wherein said step of providing a record instruction includes manually pushing a push switch, where the first state is obtained by pushing the push switch.

* * * * *

UNITED STATES PATENT AND TRADEMARK OFFICE
CERTIFICATE OF CORRECTION

PATENT NO. : 6,714,718 B1
DATED : March 30, 2004
INVENTOR(S) : Makoto Takayama et al.

It is certified that error appears in the above-identified patent and that said Letters Patent is hereby corrected as shown below:

Title page,
Item [54], Title, "RECORDING AND REPRODUCING APPARATUS COMPRISING RECORDING MEANS FOR RECORDING INPUT IMAGE SIGNAL OR WHICH AUTOMATICALLY REVIEWS AND PRODUCES RECORD IMAGES, A REPRODUCING SYSTEM FOR USE WITH A RECORDING DEVICE RECORDING AN IMAGE INPUT SIGNAL, AN APPARATUS FOR USE WITH A RECORDING AND REPRODUCING SYSTEM WHICH CONTINUOUSLY RECORDS A PLURALITY OF IMAGES, AND REPRODUCING METHOD "PRODUCES RECORD"

should read,

-- RECORDING AND REPROCUCING APPARATUS COMPRISING RECORDING MEANS FOR RECORDING INPUT IMAGE SIGNAL OR WHICH AUTOMATICALLY REVIEWS AND REPRODUCES RECORDED IMAGES, A REPRODUCING SYSTEM FOR USE WITH A RECORDING DEVICE RECORDING AN INPUT IMAGE SIGNAL, AN APPARATUS FOR USE WITH A RECORDING AND REPRODUCING SYSTEM WHICH CONTINUOUSLY RECORDS A PLURALITY OF IMAGES, AND A REPRODUCING METHOD --

Figure 5:
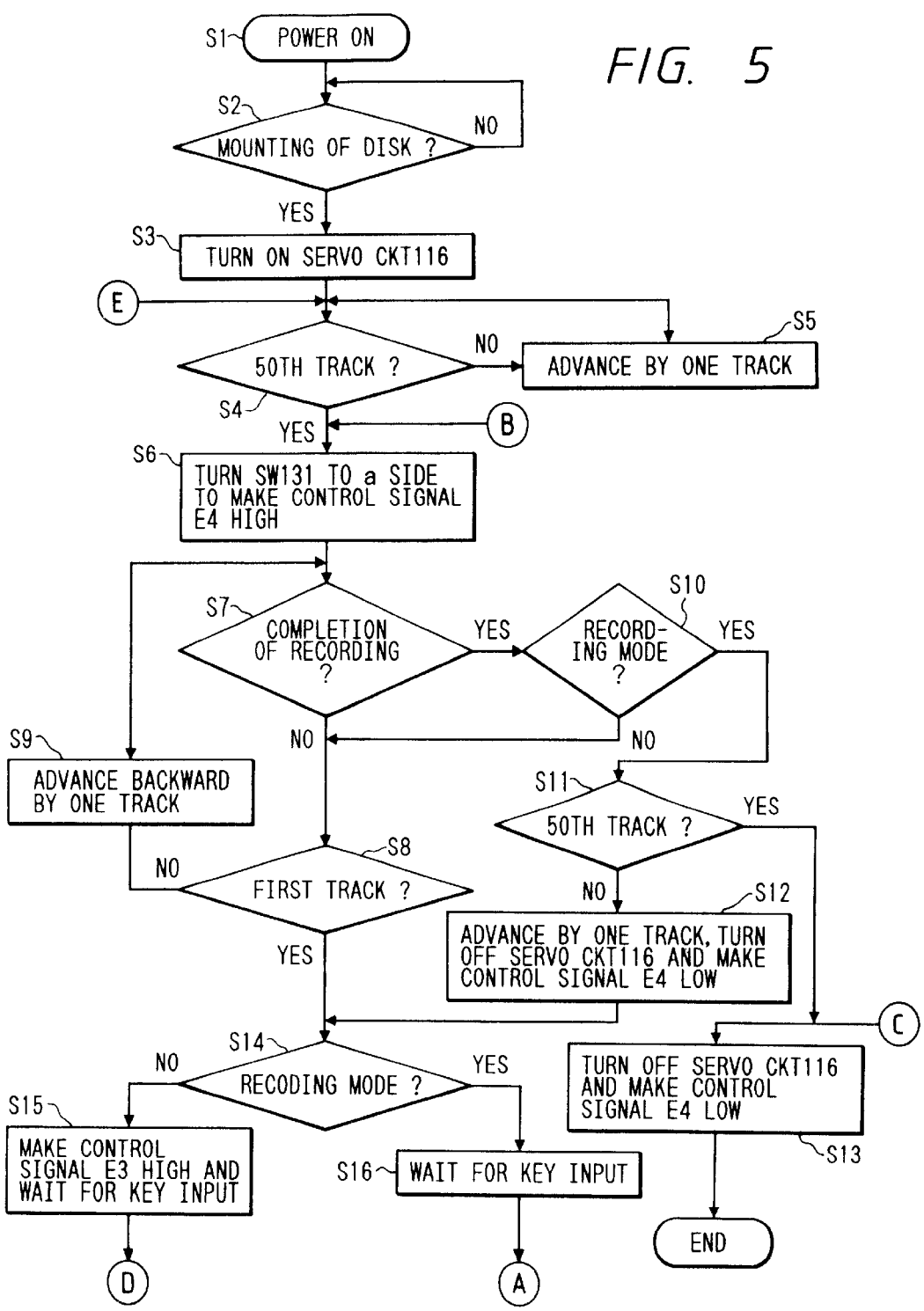
FIGS. 5 to 7 are flow charts illustrating the operation of the second embodiment.

Drawings,
Sheet 5, Fig. 5, "RECODING MODE" should read -- RECORDING MODE --.

Column 1,
Line 5, "PRODUCES RECORD" should read -- REPRODUCES RECORDED --.
Line 8, "IMAGE INPUT" should read -- INPUT IMAGE --.

Column 3,
Line 39, "heads" should read -- head --.
Line 45, "(step" should read -- (steps --.

Column 4,
Line 58, "adopter," should read -- adapter, --.

UNITED STATES PATENT AND TRADEMARK OFFICE
CERTIFICATE OF CORRECTION

PATENT NO.     : 6,714,718 B1
DATED          : March 30, 2004
INVENTOR(S)    : Makoto Takayama et al.

It is certified that error appears in the above-identified patent and that said Letters Patent is hereby corrected as shown below:

Column 6,
Line 56, "If" should read -- It --.
Line 58, "other case" should read -- cases other --.

Column 9,
Line 20, "on" should read -- an --.

Signed and Sealed this

Fifth Day of October, 2004

JON W. DUDAS
*Director of the United States Patent and Trademark Office*